US012651310B2

(12) United States Patent
Xu et al.

(10) Patent No.: US 12,651,310 B2
(45) Date of Patent: Jun. 9, 2026

(54) INPUT SCALING WITH CONVOLUTIONAL LAYERS

(71) Applicant: QUALCOMM Incorporated, San Diego, CA (US)

(72) Inventors: Haoping Xu, North York (CA); Prajakt Kulkarni, San Diego, CA (US); Suze Balatsos, Markham (CA); Neelkanth Pradhumanbhai Patel, Scarborough (CA); Sheng Zhan, Richmond Hill (CA); Brian Varga, Scarborough (CA)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 18/440,478

(22) Filed: Feb. 13, 2024

(65) Prior Publication Data

US 2025/0259264 A1    Aug. 14, 2025

(51) Int. Cl.
*G06T 3/4046*        (2024.01)
*G06T 5/60*          (2024.01)

(52) U.S. Cl.
CPC .............. *G06T 3/4046* (2013.01); *G06T 5/60* (2024.01); *G06T 2207/20081* (2013.01); *G06T 2207/20084* (2013.01)

(58) Field of Classification Search
CPC ..................... G06T 3/4046; G06T 5/60; G06T 2207/20081; G06T 2207/20084; G06N 3/063; G06N 3/0464
See application file for complete search history.

(56) References Cited

U.S. PATENT DOCUMENTS

| | | | | |
|---|---|---|---|---|
| 12,327,326 | B2 * | 6/2025 | Lee ........................ | G06T 3/4007 |
| 2020/0211229 | A1 * | 7/2020 | Hwang ..................... | G06T 3/06 |
| 2022/0044068 | A1 * | 2/2022 | Chai ....................... | G06N 3/045 |
| 2022/0164934 | A1 * | 5/2022 | Gao ........................ | G06N 3/09 |
| 2022/0405881 | A1 * | 12/2022 | Lee ........................ | G06T 3/4007 |
| 2023/0069953 | A1 * | 3/2023 | Chen ....................... | H04N 19/59 |

(Continued)

OTHER PUBLICATIONS

International Search Report and Written Opinion—PCT/US2024/057613—ISA/EPO—Feb. 14, 2025.

(Continued)

*Primary Examiner* — Atiba O Fitzpatrick
(74) *Attorney, Agent, or Firm* — Patterson & Sheridan LLP

(57)                ABSTRACT

Certain aspects of the present disclosure provide techniques and apparatus for efficient scaling of inputs to be processed by a machine learning model. An example method generally includes receiving, by a machine learning model, an input having a starting size in a plurality of dimensions. The method further includes scaling, by the machine learning model, the input in one or more dimensions of the plurality of dimensions to generate a scaled input, wherein the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value. The method further includes generating, by the machine learning model, an inference based on the scaled input.

16 Claims, 5 Drawing Sheets

400￢

Begin

410￢
Receive, by a machine learning model, an input having a starting size in a plurality of dimensions 420￢
Scale, by the machine learning model, the input in one or more dimensions of the plurality of dimensions to generate a scaled input, wherein the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value 430￢
Generate, by the machine learning model, an inference based on the scaled input End

(56) References Cited

U.S. PATENT DOCUMENTS

| | | | |
|---|---|---|---|
| 2023/0076920 A1* | 3/2023 | Chen | G06N 3/045 |
| 2024/0137518 A1* | 4/2024 | Lin | H04N 19/186 |

OTHER PUBLICATIONS

Soloveitchik M., et al., "Fully Convolutional Fractional Scaling", 2022 16th International Conference on Signal-image Technology & Internet-based Systems (SITIS), IEEE, Oct. 19, 2022, pp. 238-245, XP034327475, abstract p. 238, left-hand column, line 1-p. 244, left-hand column, last line.

Stanich M., et al., "Applications of a New Non-Integer Scaling Method", Feb. 1, 2016, pp. 46-57, XP093252852, abstract p. 47, left-hand column, line 1-p. 57, left-hand column, line 20.

* cited by examiner

400

Begin

410

Receive, by a machine learning model, an input having a starting size in a plurality of dimensions

420

Scale, by the machine learning model, the input in one or more dimensions of the plurality of dimensions to generate a scaled input, wherein the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value

430

Generate, by the machine learning model, an inference based on the scaled input

End

*FIG. 4*

INPUT SCALING WITH CONVOLUTIONAL LAYERS

INTRODUCTION

Aspects of the present disclosure relate to machine learning models, and more specifically to efficient scaling of inputs using machine learning models.

In some aspects, processing certain types of inputs using a machine learning model involves scaling of the inputs prior to processing by the model. For example, an image processing machine learning model generally expects input images to conform to a certain scale. A face detection neural network, for instance, is usually provided with images or video that are scaled based on the size of a face within the frame (e.g., which may vary based on camera field of view (based on sensor size and lens focal length) and distance from the face to the camera, amongst other properties).

Existing techniques for scaling of inputs to be processed by a machine learning model typically involve the use of dedicated scaling hardware such as a camera image signal processing (ISP) pipeline and/or software component(s) running on a central processing unit (CPU) or digital signal processor (DSP) that perform scaling of inputs. However, such techniques are inefficient and can serve as a bottleneck for machine learning tasks, particularly those that involve real-time processing of input data. The computing resource and power cost to instantiate a dedicated scaling engine such as a camera ISP pipeline is high, and the inter-processors communication delay and/or CPU/DSP scaling delay is high.

BRIEF SUMMARY

Certain aspects provide a method for efficient input scaling. An example method generally includes: receiving, by a machine learning model, an input having a starting size in a plurality of dimensions; scaling, by the machine learning model, the input in one or more dimensions of the plurality of dimensions to generate a scaled input, wherein: the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value; and generating, by the machine learning model, an inference based on the scaled input.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

FIG. 4 depicts example operations related to using convolution to perform efficient input scaling within a machine learning model, according to aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
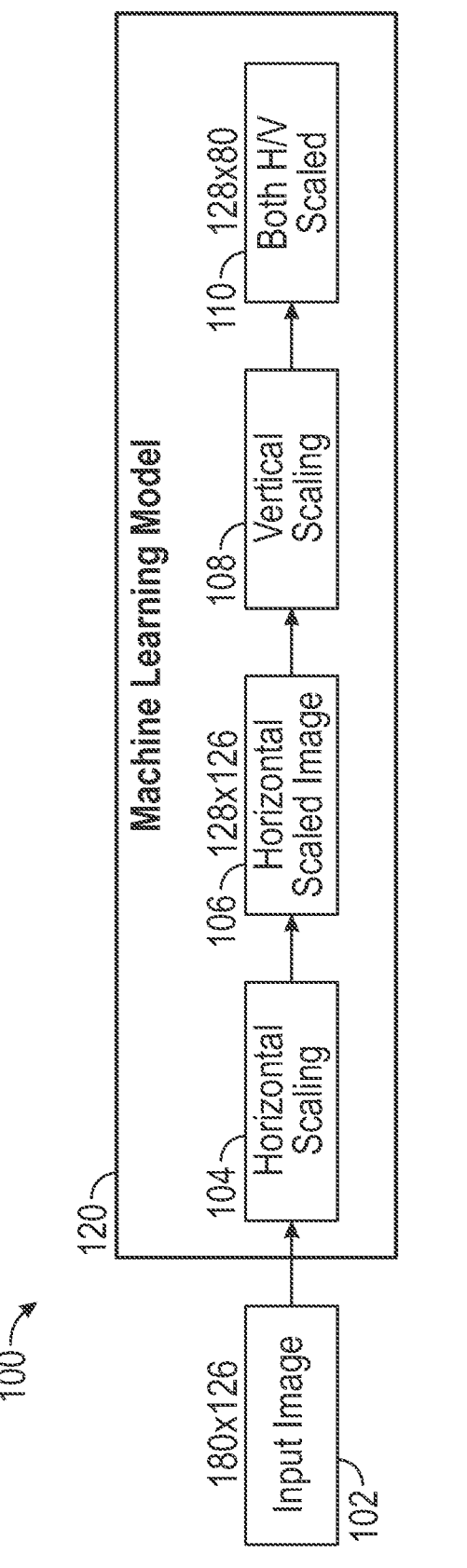
FIG. 1 depicts an example pipeline for efficient input scaling by a machine learning model, according to aspects of the present disclosure.

Aspects of the present disclosure provide techniques and apparatus for efficient input scaling within a machine learning model.

Various types of machine learning models such as neural networks can be used to detect objects in visual content, such as still images or streams of visual content (e.g. video content captured as a series of images at a given frame rate, such as 24 frames per second, 29.97 frames per second, 60 frames per second, etc.). Scaling of inputs is often performed to enable such inputs to be processed by machine learning models. For example, image processing machine learning models often accept input images that conform to a particular scale (and/or particular dimensions) so that objects present in the images can be accurately identified.

Techniques described herein involve using a machine learning model to perform input scaling itself, thereby avoiding the use of separate hardware and/or software components to perform input scaling. For example, rather than using dedicated scaling hardware such as a camera image signal processing (ISP) pipeline or a separate software component running on a central processing unit (CPU) or digital signal processor (DSP) to perform scaling of inputs, certain aspects described herein involve using one or more convolutional layers of a machine learning model to perform efficient input scaling within the existing framework of such a machine learning model, thereby avoiding inefficiencies such as cross-processor latency, memory overhead, and the like that would otherwise be associated with separately scaling inputs outside of the machine learning model.

As described in more detail below with respect to FIG. 2A, existing convolutional layers of machine learning models such as convolution neural networks (CNNs) generally perform convolution by selecting convolutional kernels using an integer stride length. Such a convolution layer may be used to perform input scaling as described herein, such as using a scale ratio as a stride length. However, using a convolution process to scale an input such as an image may involve the use of a non-integer stride length. For example, scaling an image from one size to another size may involve scale ratios that are non-integer values. Thus, to use a convolution process to perform such a scaling operation as described herein, a non-integer horizontal stride length and/or a non-integer vertical stride length may be beneficial. As described in more detail below with respect to FIG. 2B, techniques described herein support non-integer stride length(s) by selecting reference points within convolutional kernels based on non-integer stride length(s) and weighting input components within a convolutional kernel that are closer to the reference point of the convolutional kernel more highly than input components that are farther from the reference point. For example, an image scaling operation may be performed through convolution by using depth-wise convolutional kernels to select surrounding pixel data as convolution activation. A convolutional kernel size (e.g., in pixels) and/or a number of convolutional kernels can be configured in order to achieve a certain quality or resolution for the output of the scaling operation.

As described in more detail below with respect to FIG. 1, an input may be scaled in multiple dimensions (e.g., horizontally and vertically) either sequentially as separate convolution operations (e.g., first one dimension and then another) or concurrently as part of a single convolution operation.

As described in more detail below with respect to FIG. 3, convolutional kernels may be selected by aligning a first output component (e.g., pixel) with a first input component (e.g., to select a first kernel), aligning a last output component with a last input component (e.g., to select a last kernel), and evenly dividing the space between the first input component and the last input component evenly according to the scale ratio to select intermediate kernels. The scale ratio may be calculated based on the input size and the desired output size, such as according to a formula. Each input component may be divided into a configurable number of segments or phases (e.g., based on a target quality or resolution) and such segments or phases may allow for selecting a point within an input component as a reference point for a kernel based on the stride length, as described below with respect to FIG. 4.

Outputs generated by machine learning models that generate inferences based on inputs scaled within the machine learning models as described herein can be used for various tasks, such as object detection, motion prediction, and the like. For example, neural networks such as CNNs or transformer neural networks can be used to scale images and then detect objects in the scaled images. Based on the detection of various objects in visual content, various actions can be taken depending on the application in which these neural networks are deployed; for example, these actions may include controlling an autonomous vehicle so as to avoid a collision between the autonomous vehicle and objects or obstacles in a scene, controlling a robot to perform a task without the robot or its payload colliding with other objects in a scene, detecting motion or other unexpected activity in a surveilled environment, introducing visual effects in extended reality or mixed reality environments, or the like.

Visual content may be processed based on various techniques in order to trigger various actions on a computing system. For example, neural networks can perform optical flow estimation across frames of video content to estimate motion of various objects within a scene based on the intensity (e.g., the luminance of an object, which may be a single value for greyscale images or values for each of a plurality of color channels for color images (e.g., the red, green, and blue (RGB) channels in images captured using an additive color model)) of objects within these frames, based on the assumption that the color and luminance of an object do not significantly change across different frames. Neural networks can be used to perform scene flow estimation in order to predict the motion of objects within the scene based on previous motion of these objects in prior frames. In still another example, neural networks can be used to perform correspondence estimation between different images in order to identify matching portions of these images.

Aspects of the present disclosure provide techniques that allow for efficient scaling of inputs to be processed by a machine learning model through the use of one or more convolutional layers of the machine learning model to perform the input scaling without the use of separate hardware and/or software components for such scaling. Thus, techniques described herein constitute a technical improvement with respect to conventional input scaling techniques by avoiding the high computing resource and power costs to instantiate a dedicated scaling engine such as a camera ISP pipeline, and avoiding the high inter-processors communication delay and/or CPU/DSP scaling delays associated with using separate software components to perform input scaling. Rather, aspects of the present disclosure allow input scaling to performed on a typical neural processing unit (NPU) as part of operations of the machine learning model, thereby providing significant area savings compared to typical dedicated scaling hardware such as an ISP scaling module and significant performance and power improvements compared to software solutions where scaling is handled by a CPU or DSP. For example, a camera scaling module typically includes one downscaling module and one upscaling module, having a total area that covers a substantial percentage of the area of a typical neural network processing unit that can perform techniques described herein. Furthermore, software solutions that perform scaling on a CPU or DSP are typically significantly slower than techniques described herein. Additionally, certain aspects described herein support a larger number of input channels (e.g., 1/2/3/4/8/16, etc.), while conventional scaling techniques (e.g., those associated with imaging devices) generally work only for 1/2/3 channels (e.g., RGB/YUV).

Example Efficient Scaling of Inputs within a Machine Learning Model

FIG. 1 depicts an example pipeline 100 for efficient scaling of inputs within a machine learning model. In the example pipeline 100, an input image 102, having a starting resolution of 180×126, is scaled within a machine learning model 120 to a target resolution of 128×80, producing a horizontally and vertically scaled image 110. It is noted that while certain aspects are described herein with respect to scaling of images, other types of inputs may also be scaled along one or more dimensions (e.g., spatial or non-spatial) according to techniques described herein.

First, the machine learning model 120 performs horizontal scaling 104 on the input image 102 to produce a horizontally scaled image 106 that is 128 pixels wide and 126 pixels tall (e.g., scaled from the starting resolution of 180 pixels wide and 126 pixels tall). Then, the machine learning model 120 performs vertical scaling 108 on the horizontally scaled image 106 to produce the horizontally and vertically scaled image 110 that is 128 pixels wide and 80 pixels tall. Alternatively, the machine learning model 120 may perform vertical scaling before horizontal scaling, or may perform horizontal and vertical scaling together as part of a single convolution operation.

The horizontal scaling 104 and vertical scaling 108 may, for example, be performed by one or more convolutional layers of the machine learning model 120, such as running on a neural processing unit (NPU). In some aspects, the horizontally and vertically scaled image 110 may then be processed through one or more additional layers of the machine learning model 120 to produce an inference, such as an indication of whether a certain object is present in the image.

Example Convolution Operation

Figures 2A, 2B:
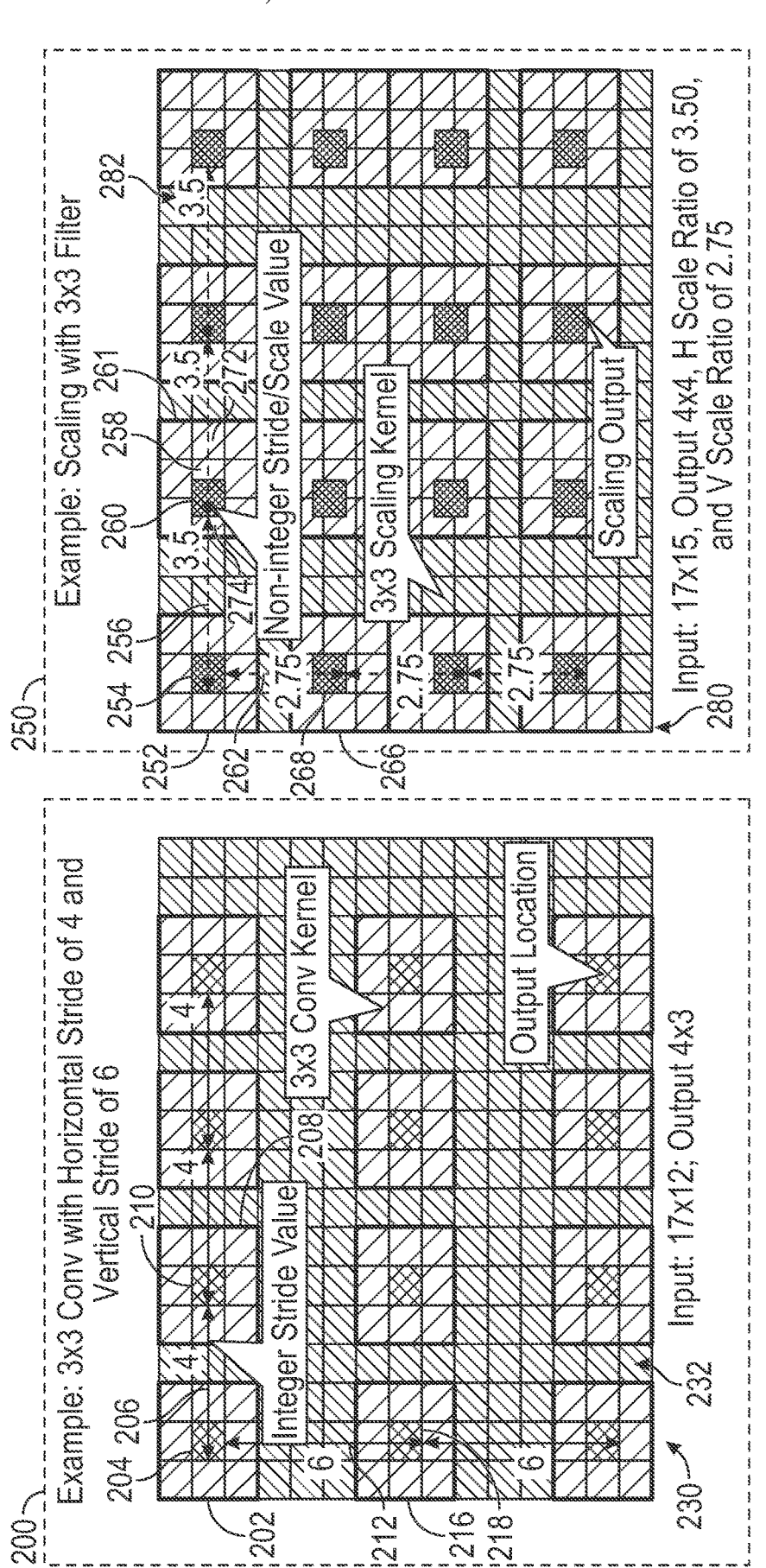
FIG. 2A depicts convolution by a machine learning model.
FIG. 2B depicts an example of using convolution to perform efficient input scaling within a machine learning model, according to aspects of the present disclosure.

FIG. 2A depicts a technique 200 for convolution by a machine learning model. The technique 200 may be modified as discussed below with respect to FIG. 2B in order to perform efficient input scaling as described herein.

In the technique 200, an image 230 includes a plurality of pixels, such as pixel 232. Performing convolution generally involves selecting a series of convolutional kernels, such as kernels 202 and 208, in a given direction (e.g., horizontal or vertical) in order to compute output values from the elements (e.g., pixels of an image) covered by a convolutional kernel. In the depicted example, the technique 200 is configured to select 3×3 kernels with a horizontal stride length of 4 and a vertical stride length of 6. Thus, the kernel 202 begins at the horizontal edge of the image 230, is 3 pixels wide and 3 pixels tall, and includes a reference point 204 that is the central pixel of the kernel. The output value of the kernel 202 may be calculated in such a manner that the contents of the pixel corresponding to the reference point 204 is weighted more highly than the contents of the surrounding pixels in the kernel 202. A horizontal stride 206 (e.g., having a length of 4) is then used to select a reference point 210 for the next kernel 208. For example, the reference point 210 may be selected by moving four pixels ahead from the reference point 204, according to the horizontal stride length. The kernel 208 is also a 3×3 kernel. The output value of the kernel 208 may be calculated in such a manner that the contents of the pixel corresponding to the reference point 210 are weighted more highly than the contents of the surrounding pixels in the kernel 208. Such a process may repeat until the final horizontal pixel of the image 230 is reached.

A similar process may be performed vertically, such as starting with the kernel 202 with the reference point 204 and then using vertical stride 212 (e.g., having a length of 6) to select a reference point 218 of the next kernel 216, and repeating this process until the last vertical pixel of the image 230 is reached.

Convolution is a useful mechanism for performing input scaling, as described herein, but a convolution technique for input scaling is modified according to certain aspects of the present disclosure to support non-integer stride lengths, as described below with respect to FIG. 2B.

Example Use of Convolution to Perform Efficient Input Scaling

FIG. 2B illustrates a technique 250 for performing efficient input scaling within a machine learning model. Unlike the technique 200 of FIG. 2A, the technique 250 supports non-integer stride values, and can thus be used to scale inputs when a scale ratio is a non-integer value.

In the technique 250, an image 280 includes a plurality of pixels such as pixel 282. The image 280 has a starting resolution (also referred to as dimensions or size) of 17×15, and is to be scaled to a target resolution of 4×4 using convolution.

A horizontal scaling ratio and a vertical scaling ratio may be calculated according to a particular formula based on the starting resolution and the target resolution of the image 280, and these scaling ratios may be used as horizontal and vertical stride lengths, respectively. Calculation of scaling ratios is described in more detail below with respect to FIG. 3.

A kernel 252 is a 3×3 kernel having a reference point 254 that corresponds to the central pixel of the kernel 252. Kernel size may be a configurable value, such as based on a target quality or resolution of the scaled image. When calculating the convolutional output of the kernel 252, the pixel corresponding to the reference point 254 may be weighted more highly than the surrounding pixels, which are farther from the reference point 254.

A stride 256, having a stride length of 3.5 (e.g., which is the horizontal scale ratio in this example) is used to select the next reference point 260 of the next kernel 261. The kernel 261 is a 3×3 kernel, and the reference point 260 is off-center for the kernel 261. For example, the reference point 260 may be selected by moving 3.5 pixels forward (e.g., to the right) from the reference point 254, and the kernel 261 may be selected by identifying, as a central pixel, the nearest pixel 258 that begins after the beginning of the reference point 260, and using that central pixel as the "center" of a 3×3 kernel of pixels. When calculating the convolutional output of the kernel 261, the pixels within the kernel 261 that are closer to the reference point 260 may be weighted more highly than pixels within the kernel 261 that are farther from the reference point 260. For example, pixels 258 and 274 may be weighted more highly than pixel 272, as the pixels 258 and 274 are closer to the reference point 260 than the pixel 272.

This process may be repeated horizontally until the horizontal edge (e.g., the last horizontal pixel) of the image 280 is reached (e.g., when the horizontal edge of the image 280 is covered by the convolutional filter).

A similar process may be performed in order to vertically scale the image 280. For example, a stride 262, having a stride length of 2.75 (e.g., which is the vertical scale ratio in this example) is used to select the next reference point 268 of the next kernel 266. The kernel 266 is a 3×3 kernel, and the reference point 268 is off-center for the kernel 266. For example, the reference point 268 may be selected by moving 2.75 pixels down from the reference point 254, and the kernel 266 may be selected by identifying, as a central pixel, the nearest pixel that begins after the beginning of the reference point 268, and using that central pixel as the center of a 3×3 kernel of pixels. When calculating the convolutional output of the kernel 266, the pixels within the kernel 266 that are closer to the reference point 268 may be weighted more highly than pixels within the kernel 266 that are farther from the reference point 268.

This process may be repeated vertically until the bottom (e.g., the last vertical pixel) of the image 280 is reached.

Figure 3:
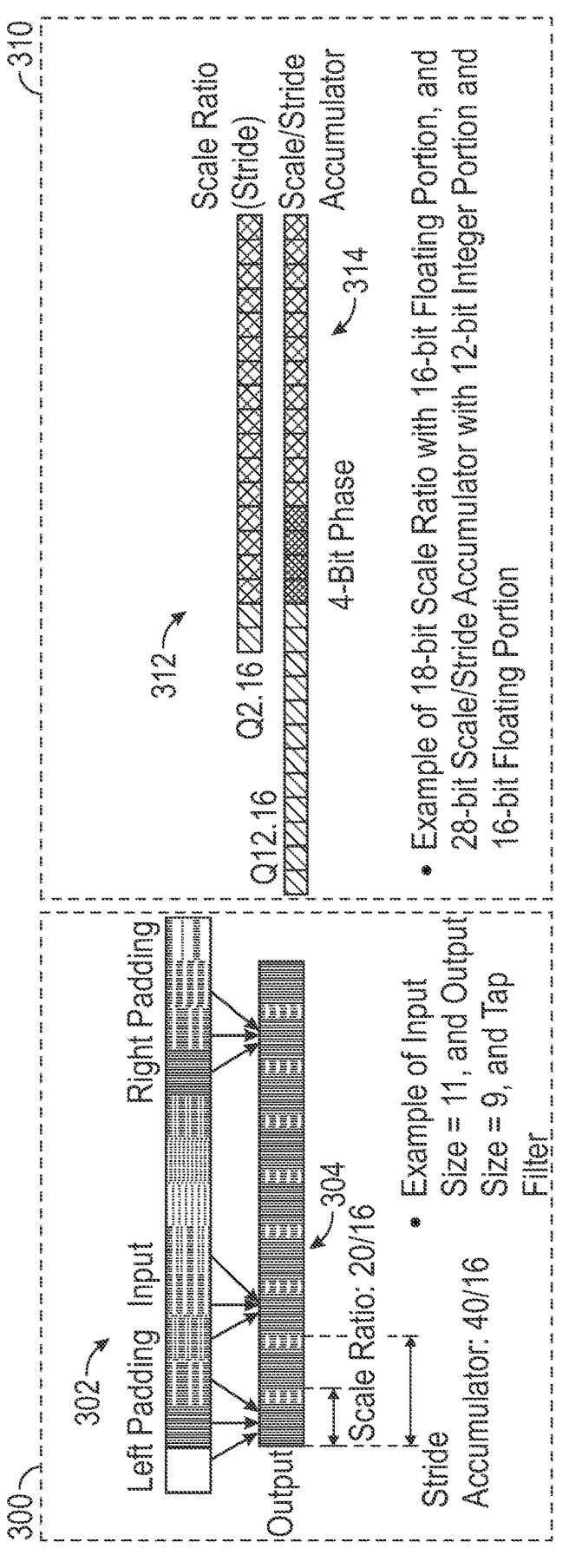
FIG. 3 depicts an example related to using convolution to perform efficient input scaling within a machine learning model, according to aspects of the present disclosure.

FIG. 3 includes illustrations 300 and 310 related to efficient input scaling within a machine learning model.

The illustration 300 shows an example of efficient scaling of an input of size 11 (e.g., having 11 horizontal pixels or other components) to an output of size 9. A scaling ratio is calculated based on the horizontal input size of 11 and the horizontal output size of 9, such as according to a formula.

In one example implementation, the formula is:

$$horizontal\_scaling\_ratio=(input\_horizontal\_size-1)/(output\_horizontal\_size-1),$$

where input_horizontal_size is the horizontal width (e.g., in pixels) of the input and output_horizontal_size is the horizontal width of the target output. Subtracting one from the input size and output size produces the numbers of distances between components (e.g., pixels) rather than the numbers of components themselves, which is what matters for the purpose of determining a scale ratio.

Thus, based on a horizontal input size of 11 and a horizontal output size of 9, horizontal_scaling_ratio=(11−1)/(9−1)=10/8=1.25.

In one example, as shown in the illustration 310, the scale ratio is converted from a floating-point value to a fixed-point representation 312 (e.g., including a number of bits that represent a floating portion) through additional computations. For example, in such aspects, the formula may be:

$$horizontal\_scaling\_ratio=floor\ [(input\_horizontal\_size-1)/(output\_horizontal\_size-1)*2^{16}].$$

This is based on an algorithm for converting a floating-point value to a fixed-point representation, which involves calculating $x=floating\_input*2^{(fractional\_bits)}$, rounding x to the nearest whole number (e.g. round(x), floor(x), or ceil(x)), and storing the rounded x as an integer. A 16-bit floating portion in the fixed-point representation may be used to achieve a desired scaling quality, although other sizes of floating portions may alternatively be used to achieve different scaling qualities. In such cases, $2^{16}$ may be replaced in the formula with $2^i$, where i is the number of bits in the floating portion. In the fixed-point representation 312 of the scale ratio, 2 bits represent the integer value, and 16 bits represent the floating portion.

Given an input size of 11 and a target output size of 9, with a scale ratio of 10/8 or 1.25, a machine learning model efficiently scales input 302 to produce output 304 using convolution as described herein. For example, with a kernel size of 3×3 (e.g., which may be referred to as a horizontal 3-tap filter), a convolutional layer of the machine learning model may select, from the input 302, a series of 9 kernels, each with a horizontal width of 3, based on a stride length of 10/8 or 1.25, to produce the output 304.

The first three components (e.g., pixels) of the input 302 are used for the first kernel, the convolutional output of which is used to produce a first component (e.g., feature, which may be representative of a plurality of pixels of a scaled image) of the output 304. The output of the kernel may be computed in a manner that applies higher weights to components closer to a reference point of the kernel (e.g., pixels 258 and 274 of FIG. 2B) than to components that are farther from the reference point (e.g., pixel 272 of FIG. 2B). In one example, with reference to FIG. 2B, the kernel centered on the reference point 254 uses equal weights for convolving the pixels covered by the kernel, while the kernel centered on the reference point 260 has equal weights vertically but unequal weights horizontally.

The scale ratio is then used as a stride length to select the reference point for the next kernel. For example, each component (e.g., representing a pixel of a scaled image) may be divided into a given number of "phases," and each such phase may be used as an increment when stepping through components according to a stride length. In the illustration 300, each component of the input 302 has been divided into 16 phases (16 is included as an example, and other numbers of phases are possible). Thus, with a stride length of 10/8, which can be represented as 20/16, each stride will involve a move of 20 phases (e.g., 20 increments of 1/16 of a component). Thus, the reference point of a next kernel may be 20 phases after the reference point of the current kernel. The reference point of a kernel may not be the centermost point of the kernel. Thus, when calculating an output of the kernel, data within the kernel that is closer to the reference point is weighted more highly than data from the kernel that is farther from the reference point. Once the data and weights for a kernel are chosen, a convolution technique may be used to compute the output of the kernel.

As shown in the illustration 310, a scale/stride accumulator 314 may be used to track a current position (e.g., in terms of phases) as the kernels are determined. For example, the scale/stride accumulator 314 may be a 28-bit value with a 12-bit integer portion and a 16-bit floating portion (e.g., 4 bits of which may be a phase portion). Other numbers of bits are possible. Starting at index 0 (or another initial point), for every next reference point, the scaling ratio (stride length) is added to the scale/stride accumulator 314 relative to the input location. For example, if a first output location is at location 0, an initial value of the scale/stride accumulator 314 may be 0. Then, the stride length of 20/16 may be added to the scale/stride accumulator 314 when the first stride is taken, and so on. This may allow the machine learning model to keep track of locations as the model moves through the phases of the input 302 to determine kernels and compute outputs of the kernels.

The integer portion of the scale/stride accumulator 314 may be used to select the 3 closest input components (e.g., pixels) for inclusion in a kernel. It is noted that a 3-tap filter is included as an example, and other numbers of taps are possible depending on a target quality. The phase part of the floating portion of the scale/stride accumulator 314 may be used to select convolution weight(s). For example, the same input component may have different weight(s) depending on the phase (e.g., to which phase the reference point for the kernel corresponds).

Vertical scaling may be handled in a similar manner to that described and shown with respect to horizontal scaling. In some aspects, horizontal scaling is performed before vertical scaling, while in other aspects vertical scaling is performed before horizontal scaling. In alternative aspects, horizontal scaling and vertical scaling are performed concurrently as part of a single (e.g., two-dimensional) convolution task. In such aspects, two scale lengths and two scale/stride accumulators may be used.

Example Operations for Efficient Input Scaling

FIG. 4 illustrates example operations 400 for efficient scaling of inputs to be processed by a machine learning model. The operations 400 may be performed, for example, by a computing device on which one or more machine learning models (e.g., artificial neural networks) are deployed for use in various machine learning tasks (e.g., computer vision tasks), such as processing system 500 illustrated in FIG. 5. These computing devices may include, for example and without limitation, user equipments (UEs) in a wireless communication network, autonomous vehicles, IoT devices, other edge processing devices in a wireless communication network, or the like. The operations 400 may involve performing an image scaling operation in a similar manner to that described above with respect to FIGS. 1-3.

As illustrated, the operations 400 begin at block 410, with receiving, by a machine learning model, an input having a starting size in a plurality of dimensions. The machine learning model may, for example, be the machine learning model 120 of FIG. 1. The image may, for example, be the input image 102 of FIG. 1 or the image 280 of FIG. 2B.

The operations 400 continue at block 420, with scaling, by the machine learning model, the input in one or more dimensions of the plurality of dimensions to generate a scaled input. In some aspects, the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value. The scaling may, for example, involve the horizontal scaling 104 and the vertical scaling 108 of FIG. 1, such as being performed through a convolution process as described with respect to FIG. 2B and/or FIG. 3.

The operations 400 continue at block 430, with generating, by the machine learning model, an inference based on the scaled input.

In some aspects, the scaling of the input in the one or more dimensions is performed by one or more convolutional layers of the machine learning model. In certain aspects, the scaling of the input in the one or more dimensions is further based on a convolutional kernel size selected based on a target resolution for the input.

In some aspects, the scaling of the input in a given dimension of the one or more dimensions comprises determining a convolutional kernel that comprises: a group of elements of the input; a reference point that is based on the respective stride length associated with the given dimension and a corresponding reference point of a prior convolutional kernel; and weights for the group of elements that are based on a position of the reference point within the group of elements.

In certain aspects, the scaling of the input in the given dimension further comprises determining an output of the convolutional kernel by applying the weights to values associated with the group of elements. In some aspects, elements in the group of elements that are closer to the reference point within the group of elements are assigned higher weights in the weights than other elements in the group of elements that are farther from the reference point within the group of elements. For example, the reference point may be different than a central element of the group of elements.

In some aspects, the scaling of the input in the one or more dimensions comprises simultaneously scaling the input in the plurality of dimensions.

In certain aspects, the scaling of the input in the one or more dimensions comprises scaling the input in a first dimension of the one or more dimensions to generate an intermediate scaled input and scaling the intermediate scaled input in a second dimension of the one or more dimensions to generate the scaled input.

In some aspects, the input is an image, a first dimension of the one or more dimensions is a horizontal dimension, a second dimension of the one or more dimensions is a vertical dimension, and the starting size and the target size in each respective dimension of the one or more dimensions indicate numbers of horizontal pixels and vertical pixels.

In certain aspects, the scaling of the input in the one or more dimensions comprises scaling the input in three or more dimensions.

Example Processing System for Efficient Input Scaling

Figure 5:
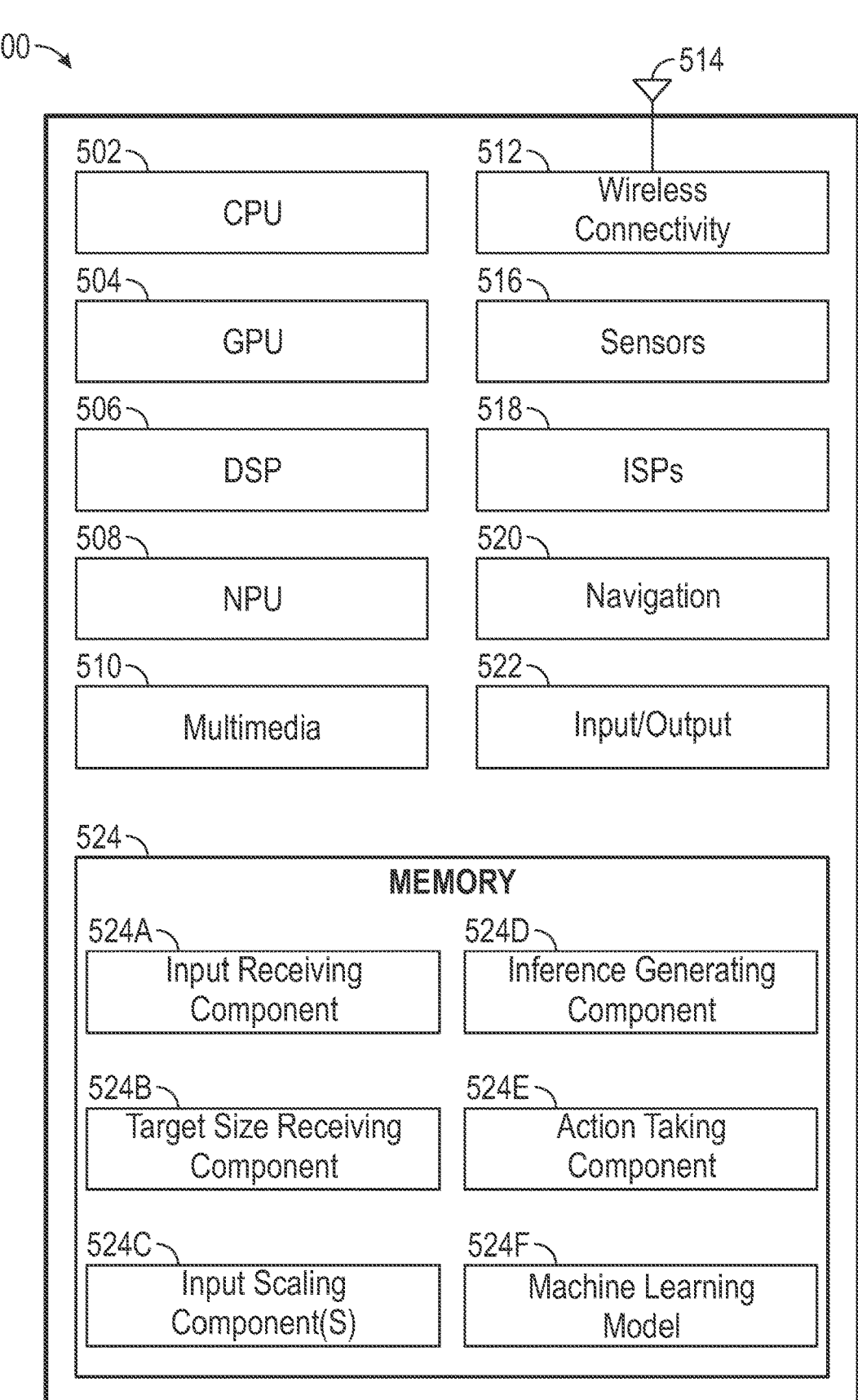
FIG. 5 depicts an example implementation of a device on which efficient input scaling within a machine learning model can be performed, according to aspects of the present disclosure.

FIG. 5 depicts an example processing system 500 for efficient input scaling using a machine learning model, such as the operations 400 of FIG. 4. The processing system 500 may also be configured to perform various machine learning tasks, such as computer vision tasks (e.g., correspondence estimation, optical flow estimation, scene flow estimation, classification, etc.).

The processing system 500 includes a central processing unit (CPU) 502, which in some examples may be a multi-core CPU. Instructions executed at the CPU 502 may be loaded, for example, from a program memory associated with the CPU 502 or may be loaded from a memory 524.

The processing system 500 also includes additional processing components tailored to specific functions, such as a graphics processing unit (GPU) 504, a digital signal processor (DSP) 506, a neural processing unit (NPU) 508, a multimedia processing unit 510, and a wireless connectivity component 512.

An NPU, such as NPU 508, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process the new piece of data through an already trained model to generate a model output (e.g., an inference).

As described herein, the NPU 508 may be configured to run a machine learning model 524F that performs efficient input scaling as described herein, such as using a convolution technique.

It should be recognized that other processing units that can be used to process visual content using neural networks, such as the CPU 502, GPU 504, DSP 506, or the like. In one implementation, the NPU 508 is a part of one or more of the CPU 502, GPU 504, and/or DSP 506.

In some examples, the wireless connectivity component 512 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and other wireless data transmission standards. The wireless connectivity component 512 may be further coupled to one or more antennas 514.

The processing system 500 may also include one or more sensor processing units 516 associated with any manner of sensor, one or more image signal processors (ISPs) 518 associated with any manner of image sensor, and/or a navigation component 520, which may include satellite-based positioning system components (e.g., GPS or GLONASS) as well as inertial positioning system components.

The processing system 500 may also include one or more input and/or output devices 522, such as screens, touch-sensitive surfaces (including touch-sensitive displays), physical buttons, speakers, microphones, and the like.

In some examples, one or more of the processors of the processing system 500 may be based on an ARM or RISC-V instruction set.

The processing system 500 also includes the memory 524, which is representative of one or more static and/or dynamic memories, such as a dynamic random access memory, a flash-based static memory, and the like. In this example, the memory 524 includes computer-executable components, which may be executed by one or more of the aforementioned processors of the processing system 500.

In particular, in this example, the memory 524 includes input receiving component 524A, target size receiving component 524B, input scaling component 524C, inference generating component 524D, and action taking component 524E. The depicted components, and others not depicted, may be configured to perform various aspects of the methods described herein. The memory 524 also includes a machine learning model 524F. In some aspects, the input receiving component 524A, target size receiving component 524B, input scaling component 524C, and inference generating component 524D are part of the machine learning model 524F. The action taking component 524E may be configured to take one or more actions based on an inference generated by the inference generating component 524D, such as generating a message, controlling a process, steering or controlling a vehicle, and/or the like based on detection of an object in an image or some other inference.

Generally, the processing system 500 and/or components thereof may be configured to perform the methods described herein.

Notably, in other aspects, elements of the processing system 500 may be omitted, such as where the processing system 500 is a server computer or the like. For example, the multimedia processing unit 510, wireless connectivity component 512, sensor processing units 516, ISPs 518, and/or navigation component 520 may be omitted in other aspects. Further, aspects of the processing system 500 may be distributed, such as training a model and using the model to generate inferences, such as user verification predictions.

Example Clauses

Implementation details of various aspects of the present disclosure are described in the following numbered clauses.

Clause 1: A processing system comprising: one or more memories comprising processor-executable instructions; and one or more processors configured to execute the processor-executable instructions and cause the processing system to: receive, by a machine learning model, an input having a starting size in a plurality of dimensions; scale, by the machine learning model, the input in one or more dimensions of the plurality of dimensions to generate a scaled input, wherein the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value; and generate, by the machine learning model, an inference based on the scaled input.

Clause 2: The processing system of Clause 1, wherein the scaling of the input in the one or more dimensions is performed by one or more convolutional layers of the machine learning model.

Clause 3: The processing system of Clause 1 or 2, wherein the scaling of the input in the one or more dimensions is further based on a convolutional kernel size selected based on a target resolution for the input.

Clause 4: The processing system of any of Clauses 1-3, wherein the scaling of the input in a given dimension of the one or more dimensions comprises determining a convolutional kernel that comprises: a group of elements of the input; a reference point that is based on the respective stride length associated with the given dimension and a corresponding reference point of a prior convolutional kernel; and weights for the group of elements that are based on a position of the reference point within the group of elements.

Clause 5: The processing system of Clause 4, wherein the scaling of the input in the given dimension further comprises determining an output of the convolutional kernel by applying the weights to values associated with the group of elements.

Clause 6: The processing system of Clause 4 or 5, wherein elements in the group of elements that are closer to the reference point within the group of elements are assigned higher weights in the weights than other elements in the group of elements that are farther from the reference point within the group of elements.

Clause 7: The processing system of any of Clauses 4-6, wherein the reference point is different than a central element of the group of elements.

Clause 8: The processing system of any of Clauses 1-7, wherein the scaling of the input in the one or more dimensions comprises simultaneously scaling the input in the plurality of dimensions.

Clause 9: The processing system of any of Clauses 1-8, wherein the scaling of the input in the one or more dimensions comprises: scaling the input in a first dimension of the one or more dimensions to generate an intermediate scaled input; and scaling the intermediate scaled input in a second dimension of the one or more dimensions to generate the scaled input.

Clause 10: The processing system of any of Clauses 1-9, wherein the input is an image, wherein a first dimension of the one or more dimensions is a horizontal dimension, wherein a second dimension of the one or more dimensions is a vertical dimension, and wherein the starting size and the target size in each respective dimension of the one or more dimensions indicate numbers of horizontal pixels and vertical pixels.

Clause 11: The processing system of any of Clauses 1-10, wherein the scaling of the input in the one or more dimensions comprises scaling the input in three or more dimensions.

Clause 12: A processor-implemented method, comprising: receiving, by a machine learning model, an input having a starting size in a plurality of dimensions; scaling, by the machine learning model, the input in one or more dimensions of the plurality of dimensions to generate a scaled input, wherein: the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value; and generating, by the machine learning model, an inference based on the scaled input.

Clause 13: The processor-implemented method of Clause 12, wherein the scaling of the input in the one or more dimensions is performed by one or more convolutional layers of the machine learning model.

Clause 14: The processor-implemented method of Clause 12 or 13, wherein the scaling of the input in the one or more dimensions is further based on a convolutional kernel size selected based on a target resolution for the input.

Clause 15: The processor-implemented method of any of Clauses 12-14, wherein the scaling of the input in a given dimension of the one or more dimensions comprises determining a convolutional kernel that comprises: a group of elements of the input; a reference point that is based on the respective stride length associated with the given dimension and a corresponding reference point of a prior convolutional kernel; and weights for the group of elements that are based on a position of the reference point within the group of elements.

Clause 16: The processor-implemented method of Clause 15, wherein the scaling of the input in the given dimension further comprises determining an output of the convolutional kernel by applying the weights to values associated with the group of elements.

Clause 17: The processor-implemented method of Clause 15 or 16, wherein elements in the group of elements that are closer to the reference point within the group of elements are assigned higher weights in the weights than other elements in the group of elements that are farther from the reference point within the group of elements.

Clause 18: The processor-implemented method of any of Clauses 15-17, wherein the reference point is different than a central element of the group of elements.

Clause 19: The processor-implemented method of any of Clauses 12-18, wherein the scaling of the input in the one or more dimensions comprises simultaneously scaling the input in the plurality of dimensions.

Clause 20: An apparatus, comprising: means for receiving, by a machine learning model, an input having a starting size in a plurality of dimensions; means for scaling, by the machine learning model, the input in one or more dimensions of the plurality of dimensions to generate a scaled input, wherein: the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value; and means for generating, by the machine learning model, an inference based on the scaled input.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:
one or more memories comprising processor-executable instructions; and
one or more processors configured to execute the processor-executable instructions and cause the processing system to:
    receive, by a machine learning model, an input having a starting size in a plurality of dimensions;
    scale, by the machine learning model, the input in one or more dimensions of the plurality of dimensions to generate a scaled input, wherein:
        the input is scaled in each respective dimension of the one or more dimensions based on a respective stride length determined based on a starting size in the respective dimension and a target size in the respective dimension, and
        the respective stride length associated with at least one dimension in the one or more dimensions comprises a non-integer value; and
    generate, by the machine learning model, an inference based on the scaled input;
    wherein, to scale the input in a given dimension of the one or more dimensions, the one or more processors are configured to execute the processor-executable instructions and cause the processing system to determine a convolutional kernel that comprises:
        a group of elements of the input;
        a reference point that is based on the respective stride length associated with the given dimension and a corresponding reference point of a prior convolutional kernel, wherein the reference point is different than a central element of the group of elements; and
        weights for the group of elements that are based on a position of the reference point within the group of elements.

2. The processing system of claim 1, wherein one or more convolutional layers of the machine learning model are configured to scale the input in the one or more dimensions.

3. The processing system of claim 1, wherein the one or more processors are configured to execute the processor-executable instructions and cause the processing system to scale the input in the one or more dimensions further based on a convolutional kernel size selected based on a target resolution for the input.

4. The processing system of claim 1, wherein, to scale the input in the given dimension, the one or more processors are configured to execute the processor-executable instructions and cause the processing system to determine an output of the convolutional kernel by applying the weights to values associated with the group of elements.

5. The processing system of claim 1, wherein elements in the group of elements that are closer to the reference point within the group of elements are assigned higher weights in the weights than other elements in the group of elements that are farther from the reference point within the group of elements.

6. The processing system of claim 1, wherein, to scale the input in the one or more dimensions, the one or more processors are configured to execute the processor-executable instructions and cause the processing system to simultaneously scale the input in the plurality of dimensions.

7. The processing system of claim 1, wherein, to scale the input in the one or more dimensions, the one or more processors are configured to execute the processor-executable instructions and cause the processing system to:
    scale the input in a first dimension of the one or more dimensions to generate an intermediate scaled input; and
    scale the intermediate scaled input in a second dimension of the one or more dimensions to generate the scaled input.

8. The processing system of claim 1, wherein the input is an image, wherein a first dimension of the one or more dimensions is a horizontal dimension, wherein a second dimension of the one or more dimensions is a vertical dimension, and wherein the starting size and the target size in each respective dimension of the one or more dimensions indicate numbers of horizontal pixels and vertical pixels.

9. The processing system of claim 1, wherein, to scale the input in the one or more dimensions, the one or more processors are configured to execute the processor-executable instructions and cause the processing system to scale the input in three or more dimensions.

10. A processor-implemented method of machine learning, comprising:
    receiving, by a machine learning model, an input having a starting size in a plurality of dimensions;
    scaling, by the machine learning model, the input in one or more dimensions of the plurality of dimensions to generate a scaled input, wherein:
        the input is scaled in each respective dimension of the one or more dimensions based on a respective stride length determined based on a starting size in the respective dimension and a target size in the respective dimension, and
        the respective stride length associated with at least one dimension in the one or more dimensions comprises a non-integer value; and
    generating, by the machine learning model, an inference based on the scaled input;
    wherein the scaling of the input in a given dimension of the one or more dimensions comprises determining a convolutional kernel that comprises:
        a group of elements of the input;
        a reference point that is based on the respective stride length associated with the given dimension and a corresponding reference point of a prior convolutional kernel, wherein the reference point is different than a central element of the group of elements; and
        weights for the group of elements that are based on a position of the reference point within the group of elements.

11. The processor-implemented method of claim 10, wherein the scaling of the input in the one or more dimensions is performed by one or more convolutional layers of the machine learning model.

12. The processor-implemented method of claim 10, wherein the scaling of the input in the one or more dimensions is further based on a convolutional kernel size selected based on a target resolution for the input.

13. The processor-implemented method of claim 10, wherein the scaling of the input in the given dimension further comprises determining an output of the convolutional kernel by applying the weights to values associated with the group of elements.

14. The processor-implemented method of claim 10, wherein elements in the group of elements that are closer to the reference point within the group of elements are assigned higher weights in the weights than other elements in the group of elements that are farther from the reference point within the group of elements.

15. The processor-implemented method of claim 10, wherein the scaling of the input in the one or more dimensions comprises simultaneously scaling the input in the plurality of dimensions.

16. An apparatus comprising:

means for receiving, by a machine learning model, an input having a starting size in a plurality of dimensions;

means for scaling, by the machine learning model, the input in one or more dimensions of the plurality of dimensions to generate a scaled input, wherein:

the input is scaled in each respective dimension of the one or more dimensions based on a respective stride length determined based on a starting size in the respective dimension and a target size in the respective dimension, and the respective stride length associated with at least one dimension in the one or more dimensions comprises a non-integer value; and means for generating, by the machine learning model, an inference based on the scaled input;

wherein the scaling of the input in a given dimension of the one or more dimensions comprises determining a convolutional kernel that comprises:

a group of elements of the input;

a reference point that is based on the respective stride length associated with the given dimension and a corresponding reference point of a prior convolutional kernel, wherein the reference point is different than a central element of the group of elements; and weights for the group of elements that are based on a position of the reference point within the group of elements.

* * * * *